Figure 1A:
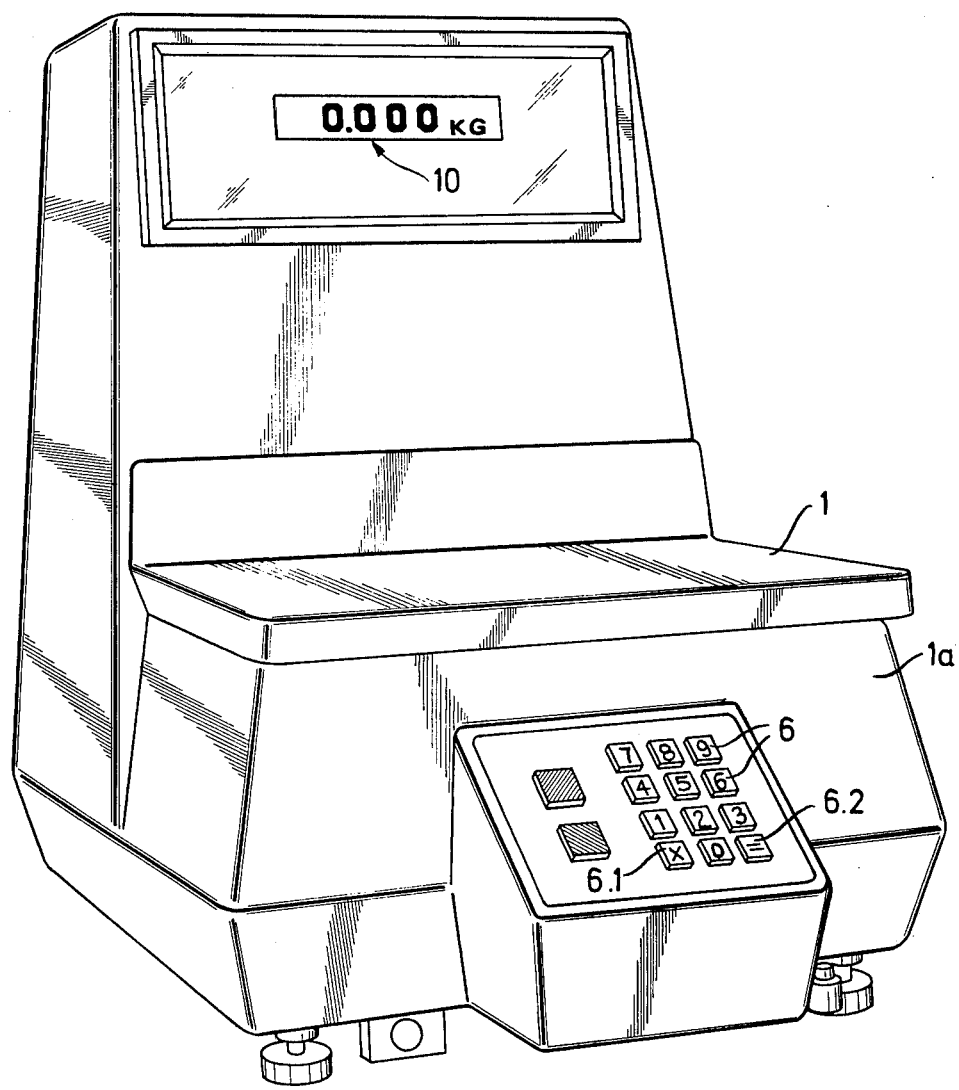

United States Patent [19]

Matilainen

[11] 4,034,818
[45] July 12, 1977

[54] SCALES, IN PARTICULAR SHOP SCALES

[75] Inventor: Waltteri Matilainen, Helsinki, Finland

[73] Assignee: Vaaka-Nyholm, Finland

[21] Appl. No.: 623,034

[22] Filed: Oct. 16, 1975

[30] Foreign Application Priority Data

Oct. 24, 1974 Finland .............................. 743109
Sept. 22, 1975 Finland .............................. 752650

[51] Int. Cl.² ........................................ G01G 19/40
[52] U.S. Cl. .............................. 177/25; 235/151.33
[58] Field of Search ....... 177/25, 1, DIG. 1, DIG. 3; 235/151.33

[56] References Cited

U.S. PATENT DOCUMENTS

| 3,608,655 | 9/1971 | Ray et al. ............................ 177/1 |
| 3,725,656 | 4/1973 | Fukuma ............................ 177/25 X |
| 3,769,498 | 10/1973 | Hino ............................ 177/25 X |
| 3,770,069 | 11/1973 | Loshbough ............................ 177/1 |

Primary Examiner—Joseph W. Hartary
Attorney, Agent, or Firm—Hill, Gross, Simpson, Van Santen, Steadman, Chiara & Simpson

[57] ABSTRACT

A scale has a display unit for digitally displaying weights, price per unit weight, and price data in sequential fashion and preferably using common digit display portions of the display unit for each of these items of data. A weight computing unit computes weight at automatically repeated periods. A manual entry price unit having a keyboard is provided for the entry of price per unit weight data. A calculator unit is supplied with data from the weight computer unit and manual entry price unit. With this information, the calculator unit computes price data. The manual entry price unit and weight computing unit have a commmon input to the calculator unit. This arrangement together with the provision of a selector unit connected to the weight computing unit and the manual entry price unit allows the passage of price per unit weight and price data sequentially after the weight data has been unchanged during at least two repeated periods. The display unit is supplied with the sequential data from the calculator unit and displays weight, price per unit weight and price sequentially.

6 Claims, 4 Drawing Figures

SCALES, IN PARTICULAR SHOP SCALES

The present invention relates to scales, in particular shop scales, with indication of weight (KG), price per unit (MK/KG) and price (MK).

Shop scales of prior art have the drawback that it is exceedingly awkward with them to observe all the three quantities mentioned. Especially buyers not closer familiar with the scales find it impossible to check the final price from the indication of the scales. It is thus understood that these shop scales of prior art are not kind to the buyer, because in practice he has no chance to check the final price himself, instead of which he has to trust the price marked by the shop assistant, or else he is compelled to carry out a difficult computation, in which he multiplies the weight or the number of pieces by the price per unit, which he possibly knows.

The aim of the invention is to eliminate the drawback mentioned and to provide improved scales, which enable all the quantities mentioned to be easily read also by the buyer.

It has been found to be an unexpected solution to the problem and one that can be carried out even more simply that in prior art, to arrange one and the same display to show digitally at least two but preferably all three of the said quantities, one after the other. The buyer is then able, first, to observe in perspicuous digital presentation that the weight is as desired. The buyer is then able to observe in the same location that the price per unit has been correctly entered, and finally the buyer may, further at the same location, read the final price.

According to regulations in certain countries the weight has to be visible all the time. To this end the scales according to the invention may easily be modified to have a separate display for the weight, whereas the unit price and final price are shown one after the other in one and the same display.

Since a person cannot simultaneously read several different data, this alternating display of the data at different times involves no embarrassment.

Figure 1B:
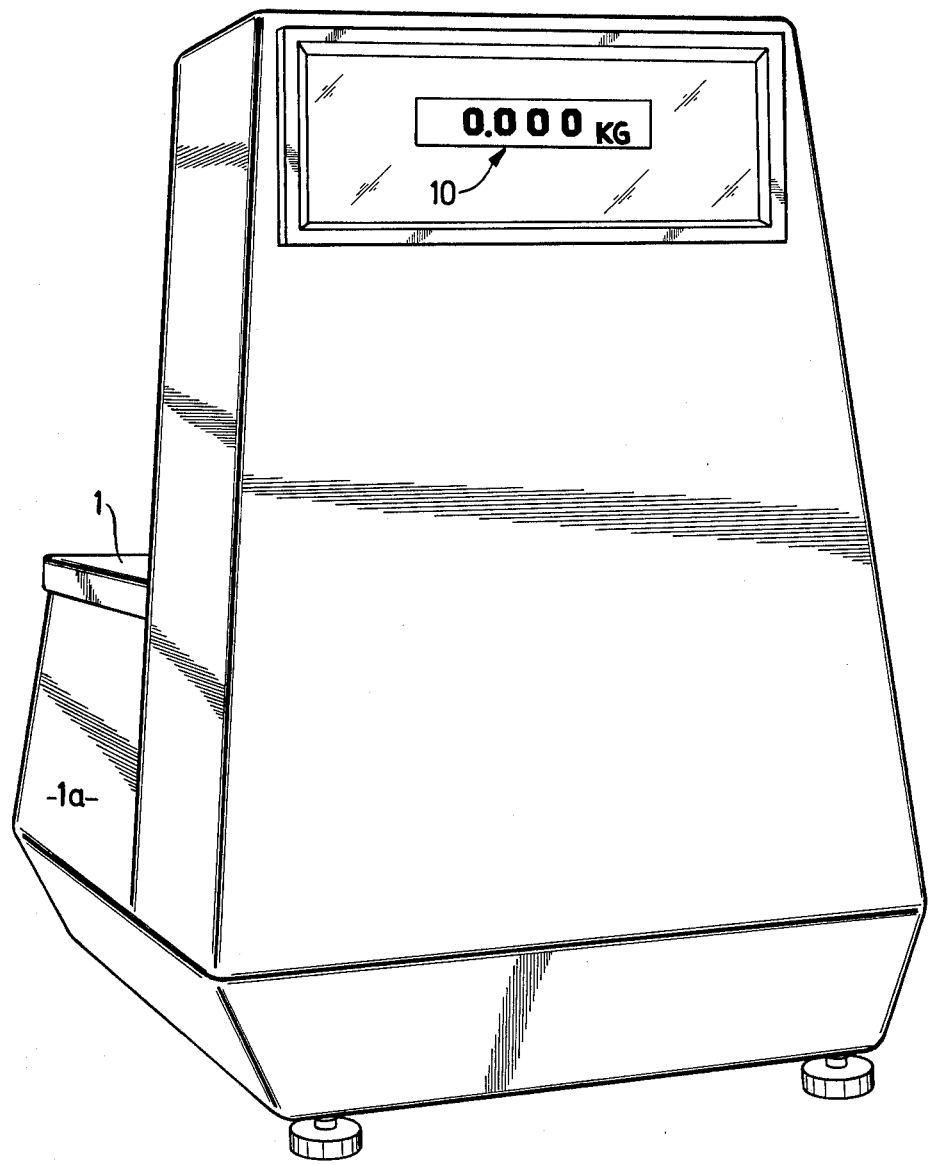

In the followihg the invention is described in greater detail with reference to the attached drawings, wherein FIGS. 1a and 1b show general views of the scales of the invention, in perspective.

Figure 2:
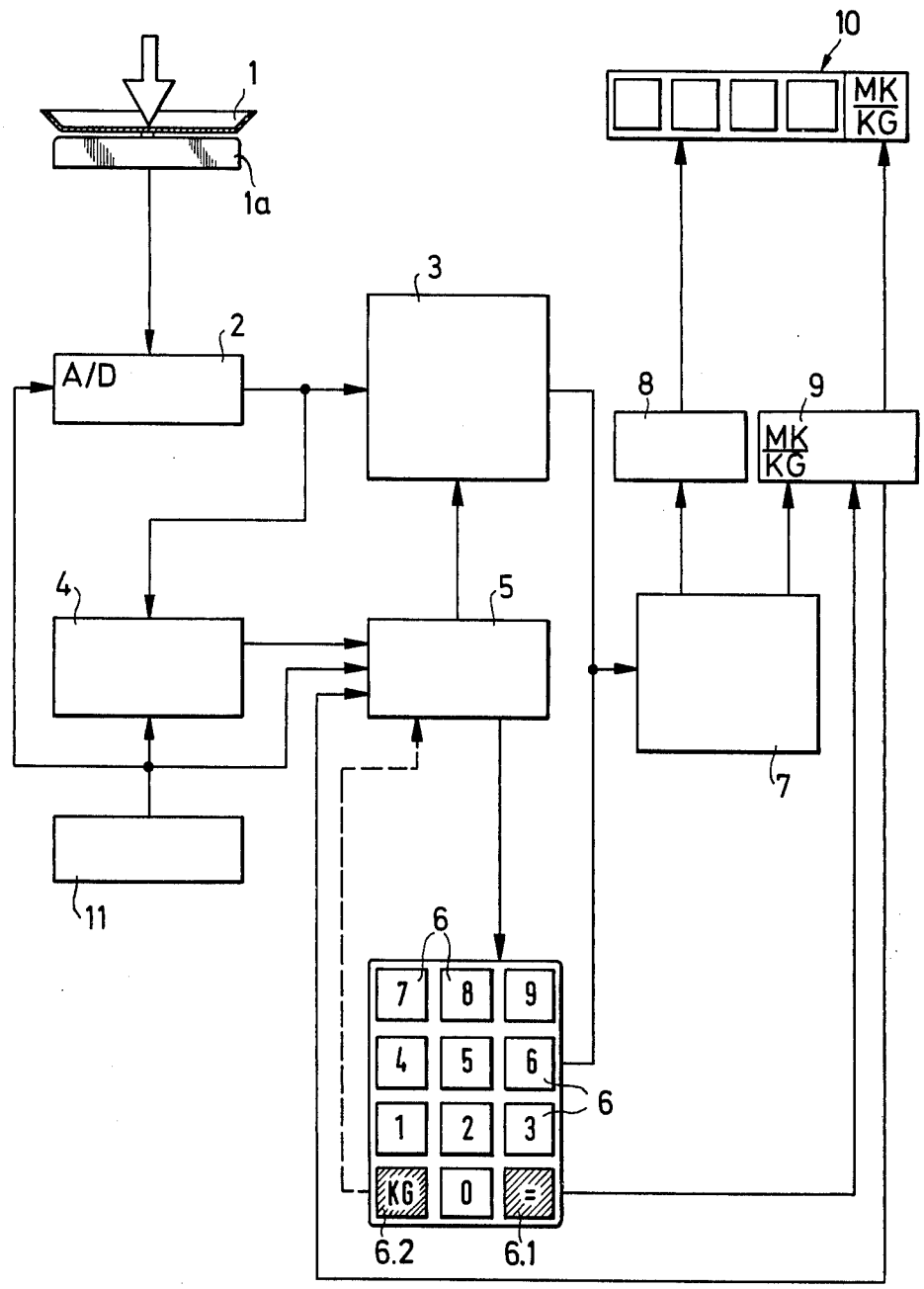
Figure 3:
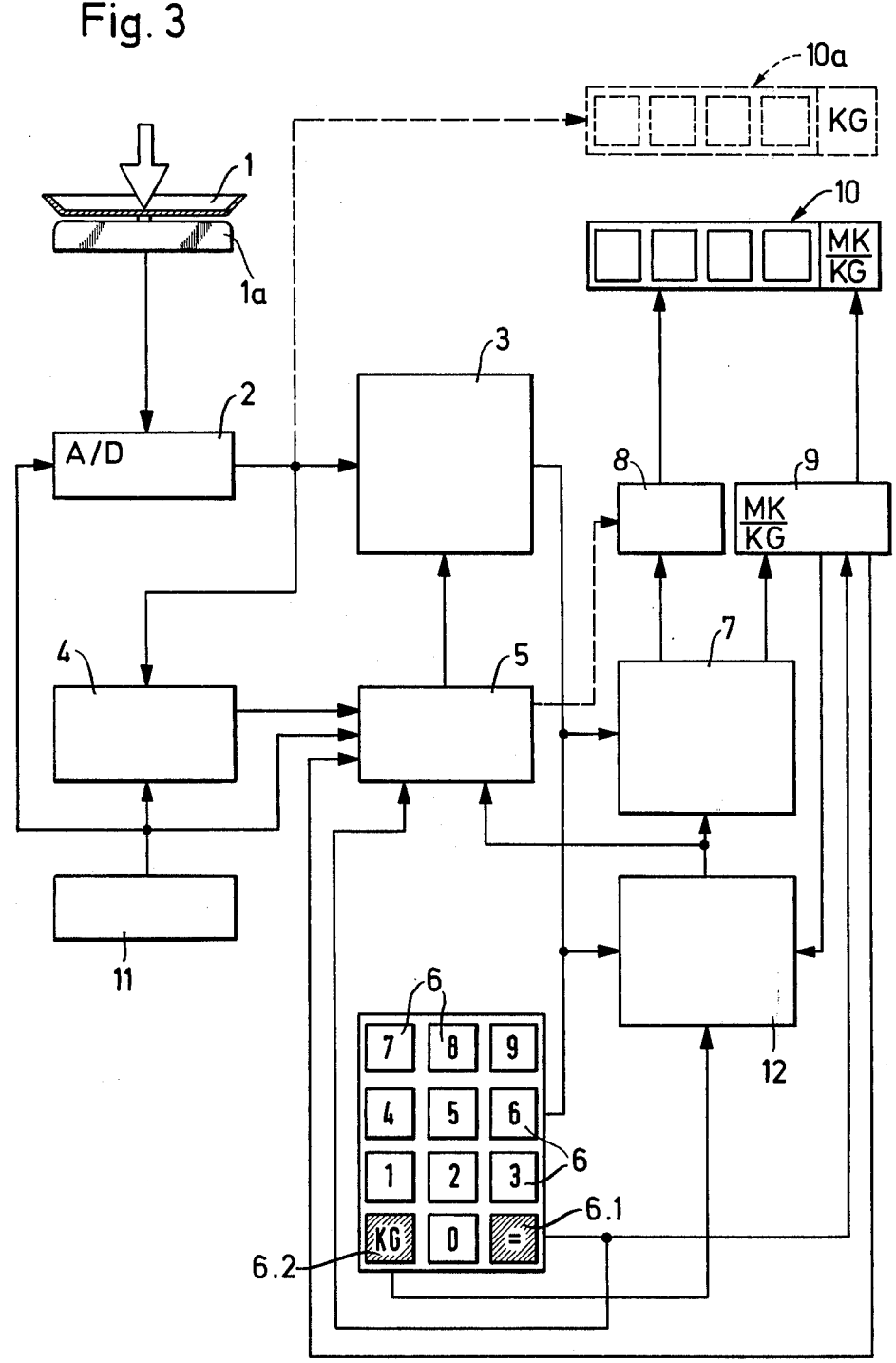

FIG. 2 shows the block diagram of a first embodiment of the scales of the invention, and FIG. 3 shows the block diagram of a second embodiment of the scales of the invention.

To begin with, the embodiment of FIG. 2 shall be described.

With the pan of the scales, schematically shown and indicated by the reference nemeral 1, is associated an electrical measuring pick-up 1a, which has been carried out e.g. in the form of a resistance bridge circuit, wherein a change of weight causes a change of resistance in one or several legs. The analogue signal derived from the measuring pick-up is converted in an analogue/digital converter 2 into digital form, which is further conveyed to the automatic weight datum 3. The automatic entry comprises the following steps. (1) Clearing, that is cancelling of previous data; (2) the first significant digit, which e.g. in scales with less than 10 KG capacity is the digit indicating the kilograms; (3) release of the decimal point, whereby the decimal point slides in between the kilogrammes and grammes; (4) the second, third and fourth digits, which indicate the grammes; (5) entering the function mode (multiplication) in the calculator 7 in order to prime it for multiplication.

The automatically entered weight datum passes, directed by the selector 5, to become the multiplicand in the calculator 7. The calculator 7 is a prefabricated component comprising one strip, of the kind which is able to show the multiplicand, the multiplier and the product, which in the present instance are: weight (KG), price per unit (MK/KG), and final price (MK). In each of its operations the calculator 7 transfers one of these data by mediation of the control 8 to the display unit 10, depending on which function mode has been given to the calculator 7. Since the foremost function of the apparatus is that of scales, the display unit 10 normally shows the weight. As will be more closely described later, the display unit 10 always indicates weight when the weight is changing and also when no new function mode has been given to the calculator 7 by the manual entry board 6, independent of whether the weight is variable or constant.

The change of weight comparison unit 4 continuously observes the changes of weight. From the timer 11 the same basic period distribution is accomplished at the A/D converter (measuring period), in the weight change comparison (comparison period) and conditionally through the selector 5 in the automatic weight datum entry (entry period). If the weight is changing, that is different weight data are obtained in two consecutive weight datum entry periods, then the change of weight comparison unit 4 keeps the selector in the state in which it conducts the weight datum to the calculator 7, but locks the manual entry 6. If, again, the weight datum is constant in two consecutive entry periods, the change of weight comparison unit 4 directs the selector to assume the state wherein it releases the locking of the entry keyboard 6. It is then possible to punch the keyboard 6 to enter the price per unit, which becomes the multiplier in the calculator 7. The depression of the first digit key on the board 6 also automatically determines the position of the decimal point in the calculator 7 so that two digits remain on the right side of the decimal point. The position of this decimal point is governed by the MK/KG logic unit 9 in that the logic unit 9 first locks the selector 5 in the state wherein the weight datum cannot pass to the calculator, where the weight datum received prior to the depression of the digit key remains as multiplicand. Secondly, the MK/KG logic unit 9 governs, controlled by the decimal point position, the indication (MK/KG) in the display which identifies the quantity displayed. It is thus understood that the first digit key depression causes the indication "KG" to be replaced with "MK/KG" in that it adds the symbols "MK/". The digits of the price per unit enter the display 10 e.g. in the manner familiar from pocket calculators, sliding from right to left as further digits are entered by depressing keys on the board 6. After ascertaining from the display 10 that the price per unit has been correctly entered, the final price is obtained by depressing the key 6.1.

As has already been described, the calculator 7 already received the "multiplication" command in the last step of the automatic weight datum entry, and therefore, after entry of the multiplier by means of the manual entry board 6, the calculator 7 merely requires the function mode for displaying the product which it has formed, that is the final price, in the display 10. In addition to supplying this function mode to the calculator 7, depression of the key 6.1 also controls the MK/KG logic unit 9 so that the logic unit 9 cancels in the display the symbols "/KG", leaving thereby only "MK". Furthermore, depression of the key 6.1 sets the logic unit 9 to lock the selector 5 for the duration of a given delay perion (e.g. 3 seconds) so that during this delay the weight datum cannot pass through to the calculator 7. When this delay has expired, the selector 5 is released and a new weight datum can pass to the calculator 7 and to the display 10, whereby the apparatus once more operates as a weight-measuring scales device. Even after the said delay the final price stays in the display 10 as long as the weight datum remains constant, that is as long as the particular object is in the pan of the scales the price of which is displayed. But even a minor change of weight, depending on the sensitivity which has been chosen for the scales, only a few grammes, causes the weight comparison unit 4 to direct the selector 5 into the state wherein the keyboard 6 is locked and the weight datum passes to the calculator 7 and to the display 10. The calculator 7 governs by virtue of the decimal point position (three digits on the right of the decimal point) the MK/KG ligic unit 9 so that the symbol KG appears in the display 10.

In order that after an erroneous entry no incorrect calculation need be carried out, the keyboard has been provided with the key 6.2, which returns the selector 5 to the state which prevailed prior to the manual entry, that is allows the weight datum to pass through to the calculator 7 and to the display 10, whereby the scales are immediately prepared for another manual price of unit entry. In fact, the key 6.2 may be used in any situation whatsoever to return the scales to the weight indication mode, which is the primary function mode of the scales and the starting situation of its other functions.

Next, the embodiment of FIG. 3 shall be described, the same names and reference numerals as in the preceding referring to identical blocks. The most substantial deviation from the embodiment of FIG. 2 is the operation of the selector 5. In order that the person using the scales might manually enter the unit price without having to wait for the weight datum to become constant, the selector 5 no longer locks the keyboard 6, but the unit price may be manually entered in the primary memory store of the calculator 7 in any situation whatsoever. Depression of the first key for the unit price datum 6 clears the calculator 7 by means of the clearing unit 12 and directs the selector 5 to the state wherein the passage of the weight datum 3 to the calculator 7 is inhibited, and it enters in the primary memory of the calculator 7 the first digit of the unit price, which at the same time is transferred to the display unit 10 and to the MK/KG logic circuit in the same manner in which this took place in the embodiment of FIG. 2. In this MK/KG the MK/Kg logic circuit controls the clearing unit 12 so that the next depression of a nemerical key 6 no longer clears the calculator 7, but this digit goes to the primary memory of the calculator 7 to join the digit already entered. In this manner the unit price may be entered into the calculator 7 and it is simultaneously transferred digit by digit also to the display unit 10, sliding in from right to left.

The final price is obtained by depressing the output key 6.1, which directs the selector 5 to the state in which the weight datum 3 can pass to the secondary memory of the calculator 7 together with the output command, provided that the change of weight comparator 4 finds that the weight has been constant during at least two consecutive entry periods.

The first step in the automatic weight datum entry is in this case either the multiplication command or the command to clear the secondary memory of the calculator; the former in case the preceding mode of operation received by the calculator 7 was clearing of the calculator 7 caused by unit price entry, and in other cases the latter. The next step in the automatic entry is the numerical weight value including the decimal point. The last step to follow is the output command, but this only in case the key 6.1 has been depressed and the weight has settled to be constant. If both conditions are not satisfied, the calculator 7 does not receive the output command; the entry periods will not be repeated and the secondary memory of the calculator will alternately be cleared and receive the new numerical weight value. In other words, when the unit price has been manually entered and the output key 6.1 has been depressed, the final price output will follow immediately after the change of weight comparator 4 has found that the weight was unchanged during at least two consecutive entry periods. What usually occurs is that the weight has time to become constant during the manual entry procedure, whereby in practice no delay is encountered in the operation of the scales.

Although in the embodiment of FIG. 3 the manual entry of the unit price prevents the accesss of the weight datum to the display 10, the depression of the output key 6.1 allows the weight datum to pass to the calculator 7 and further to the display 10. In order that the weight can be made visible if desired after the unit price has been entered, such arrangements have been made that throughout the time which the key 6.1 is kept depressed the weight datum will be shown in the display, and only the release of the key 6.1 enables the output command to be given to the calculator 7.

Since the weight will not be displayed unless it is specifically called for, either by waiting before the unit price is entered or by keeping the key 6.1 depressed long enough, and since furthermore the regulations in some countries require that the weight has to be visible all the time, a separate display 10a may be provided for the weight, to which the weight datum is conducted from immediately after the A/D converter 2 and wherein the weight datum is constantly in view. In this case the selector 5 may be arranged to govern the display control 8 so that the weight datum no longer appears in the display 10.

The key 6.2 controls the clearing unit 12 so that in any situation whatsoever the calculator 7 can be cleared and the selector 5 directed to assume the state wherein the weight datum goes to the calculator 7 and further to the display 10. The key 6.2 is also needed when there is a separate weight display 10a, so that e.g. in the case of incorrect manual entry the calculator 7 may be cleared and the unit price re-entered without having to carry the erroneous calculation to its conclusion.

As can be observed from the foregoing, the scales according to the invention are automated as far as possible. When using the scales, it is only necessary to enter manually the digits of the price per unit and, after checking from the display 10 that this entry has been correctly made, the final price is obtained by depressing one key 6.1.

The functions required in each individual block having been presented in the foregoing, a person skilled in the art, particularly the scale art, is able to realise the requisite functions in many different ways, applying the well-known teachings of the implementing electronics. For instance, the unit with the most complicated functions, i.e. the calculator 7, is available as a prefabricated component comprising one single strip. The display 10 can be advantageously embodied according to the well-known liquid crystal principle. Also, continuous computation of weights at periodic times is known in the scale art and logic circuits for embodying the automatic weight datem entry 3 and weight comparison unit 4 are well known. The selector 5 performs well-known gating functions and an embodiment of such a device given the gating functions necessary, is obvious to one in the scale art. Analogue-digital converters such as 2, manual entry keyboards such as 6, display driver units such as 8, logic units such as 9 and claring units such as 12 are well known not only in the scale art but in all arts in which electronic logic plays an important role. It may furthermore be pointed out as an advantage of the displaying method of this invention that only one display control circuit 8 is required, whereas in embodiments of prior art three such circuits would be needed, one for each quantity displayed.

I claim:

1. In a scale with display means for digitally displaying weight, price per unit weight, and price data and having weight computing means for computing weight at automatically repeated periods, manual entry price means for entry of price per unit weight data, and calculator means supplied with the data from the weight computer means and manual entry price means, said calculator means computing price data, wherein the improvement comprises said manual entry price means and weight computing means having a common input to the calculator means, said display means being supplied with data from the calculator means and displaying weight, price per unit weight, and price sequentially, and selector means connected to the weight computing means and manual entry price means for allowing the passage of price per unit weight and price data sequentially after weight data has been unchanged during at least two of said repeated periods.

2. The scale of claim 1 in which a change of weight comparison means for determining change of weight during repeated periods controls the selector means.

3. The scale according to claim 1, characterized in that the manual entry price means has key means for:
   a. clearing the calculator means through a clearing unit,
   b. directing the selector means to the state in which it inhibits the passage of the weight data to the calculator means, and
   c. entering the first digit of the price per unit weight data in the calculator means.

4. The scale according to claim 1, characterized in that the price per unit weight data passes digit by digit through the calculator means directly to the display means.

5. The scale according to claim 1, characterized by a clearing key means controlling a clearing unit and by means of which in any situation whatsover the calculator means may be cleared and the selector means directed to the state in which it passes the weight data to the calculator means and further to the display means.

6. The scale according to claim 1, characterized in that the display means has a predetermined number of individual digit display means and at least some of the digits of price per unit weight and price data are displayed by the same individual digit display means.

* * * * *